(12) United States Patent
Keng

(10) Patent No.: US 7,400,450 B2
(45) Date of Patent: Jul. 15, 2008

(54) LIGHT-SPLITTING DEVICE

(75) Inventor: Li-Teng Keng, Taipei (TW)

(73) Assignee: Prodisc Technology Inc., Taipei Hsien (TW)

( * ) Notice: Subject to any disclaimer, the term of this patent is extended or adjusted under 35 U.S.C. 154(b) by 0 days.

(21) Appl. No.: 11/303,917

(22) Filed: Dec. 19, 2005

(65) Prior Publication Data

US 2006/0209435 A1  Sep. 21, 2006

(30) Foreign Application Priority Data

Mar. 21, 2005 (TW) .............................. 94108685 A

(51) Int. Cl.
*G02B 27/10* (2006.01)
*G03B 21/14* (2006.01)
*G03B 21/22* (2006.01)

(52) U.S. Cl. ........................................ 359/618; 353/84
(58) Field of Classification Search ................ 359/618, 359/634; 353/31, 84
See application file for complete search history.

(56) References Cited

U.S. PATENT DOCUMENTS 4,060,318 A * 11/1977 Hansford ...................... 353/84
5,463,433 A * 10/1995 Koo ............................ 353/84

* cited by examiner

*Primary Examiner*—Alicia M Harrington
(74) *Attorney, Agent, or Firm*—Birch, Stewart, Kolasch & Birch, LLP

(57) ABSTRACT

A light-splitting device includes a power module, a transmission module and a filter module. In this case, the power module has a rotating component and a first connection component. The rotating component connects with the first connection component. The transmission module has a second connection component and a third connection component. The second connection component connects with the first connection component. The filter module has a filter element and a fourth connection component. The fourth connection component is disposed on one side of the filter element and connects with the third connection component. When the rotating component and the first connection component rotate, the first connection component drives the rotation of the second connection component and the third connection component, so that the third connection component drives the rotation of the fourth connection component and the filter element.

13 Claims, 6 Drawing Sheets

LIGHT-SPLITTING DEVICE

BACKGROUND OF THE INVENTION

1. Field of Invention

The invention relates to a light-splitting device and, in particular, to a light-splitting device, which is used in a projection system.

2. Related Art

Currently, image projection systems have become popular items in the optoelectronic industry owing to multiple requirements of a system having large display area, small dimension, and thin, light composition.

With reference to FIG. 1, in a projector system 1, a light source 11 emits light beams, and then the light beams are collimated and integrated by a lens 12. Then, the light beams pass through a filter element 131 of a light-splitting device 13 and a light pipe 14 sequentially. Herein, the filter element 131 is a color filter has green, red and blue sections. The light beams are then projected onto a digital micro-mirror device (DMD) 16 by a reflector 15. Then, the light beams may be projected by a projection lens 17 to form an image on a screen 18. Generally, the temperature of the light source 11 in the projection system 1 is always high to 150° C. to 200° C., so the temperature of the system is also high. A fan 19 is near to the light source 11 in order to decrease the temperature of the light source 11. Herein, the fan 19 has a plurality of blades 191 and a motor 192. The motor 192 drives the blades 191 to rotate, and the rotation of the blades 191 produce airflow, so that heat is transferred away from the projection system 1.

Referring to FIG. 1 and FIG. 2, the light-splitting device 13 mainly includes the filter element 13 and a motor 132. Herein, the motor 132 has a shaft housing 1321 and a motor body 1322. The shaft housing 1321 is disposed on one side of the motor body 1322, and a central axis passes through the shaft housing 1321. Moreover, the light-splitting device 13 further includes a fixing element 1323 and a cable (not shown). The fixing element 1323 is used for fixing the light-splitting device 13 in the projection system 1. The cable connects with a driver, which drives the motor body 1322 to rotate. The motor body 1322 is rotatable around the central axis. Herein, the motor body 1322 is mainly composed of a shell (not shown), a magnetic ring (not shown), a laminated steel stack (not shown) and a coil (not shown). When the coil is powered on, the laminated steel stack produces a magnetic force and a magnetic field. Controlling the positive/negative property and the intensity of the flowing current may change the magnetic field in sequence, or produce a rotating magnetic field, to interact with the magnetic ring and thus cause the magnetic ring to rotate. The filter element 131 is fixed on the shaft housing 1321 of the motor 132 by an adhesive, and the motor 132 drives the filter element 131 to rotate around the central axis for filtering the light beams. In the current industry, the filter element 131 may be a ring-shaped filter composed of different color sections in order to dispose on the shaft housing 1321.

As mentioned above, in the conventional light-splitting device 13, the motor 132 drives the rotation of the filter element 131 for splitting the light beams. However, the high temperature of the projection system 1 may shorten the lifetime of the motor 132. The filter element 131 is fixed on the shaft housing 1321 of the motor 132 by the adhesive. Hence, even only the motor 132 or the filter element 131 is damaged, the light-splitting device 13 is unusable. Because of the above reason, the production cost would be increased.

It is therefore an important subjective of the invention to provide a light-splitting device, which can decrease the production cost and can solve the problem which is described above.

SUMMARY OF THE INVENTION

In view of the foregoing, the invention is to provide a light-splitting device, which can reduce the use of one motor, and when only the motor or the filter element is damaged, the other element can be reused.

To achieve the above, a light-splitting device of the invention includes a power module, a transmission module and a filter module. In this case, the power module has a rotating component and a first connection component. The rotating component connects with the first connection component. The transmission module has a second connection component and a third connection component. The second connection component connects with the first connection component. The filter module has a filter element and a fourth connection component. The fourth connection component is disposed on one side of the filter element and connects with the third connection component. When the rotating component and the first connection component rotate, the first connection component drives the rotation of the second connection component and the third connection component, so that the third connection component drives the rotation of the fourth connection component and the filter element.

To achieve the above, a light-splitting device of the invention includes a power module and a filter module. In this case, the power module has a rotating component and a connection component. The rotating component connects with the connection component. The filter module has a filter element and another connection component. Another connection component is disposed on one side of the filter element and connects with the connection component. When the rotating component and the connection component rotates, the connection component drives the rotation of another connection component and the filter element.

As mentioned above, in the light-splitting device of the invention, when the rotating component and the first connection component rotate, the rotating component and the first connection component drive the rotation of the second connection component and the third connection component. Then, the third connection component drives the rotation of the fourth connection component and the filter element to split the light beams. Furthermore, the power module of the light-splitting device is a power source. Comparing to the prior art, the light-splitting device may reduce the use of one motor, and when only the motor or the filter element is damaged, the other element can be reused. Accordingly, the production cost may also be reduced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
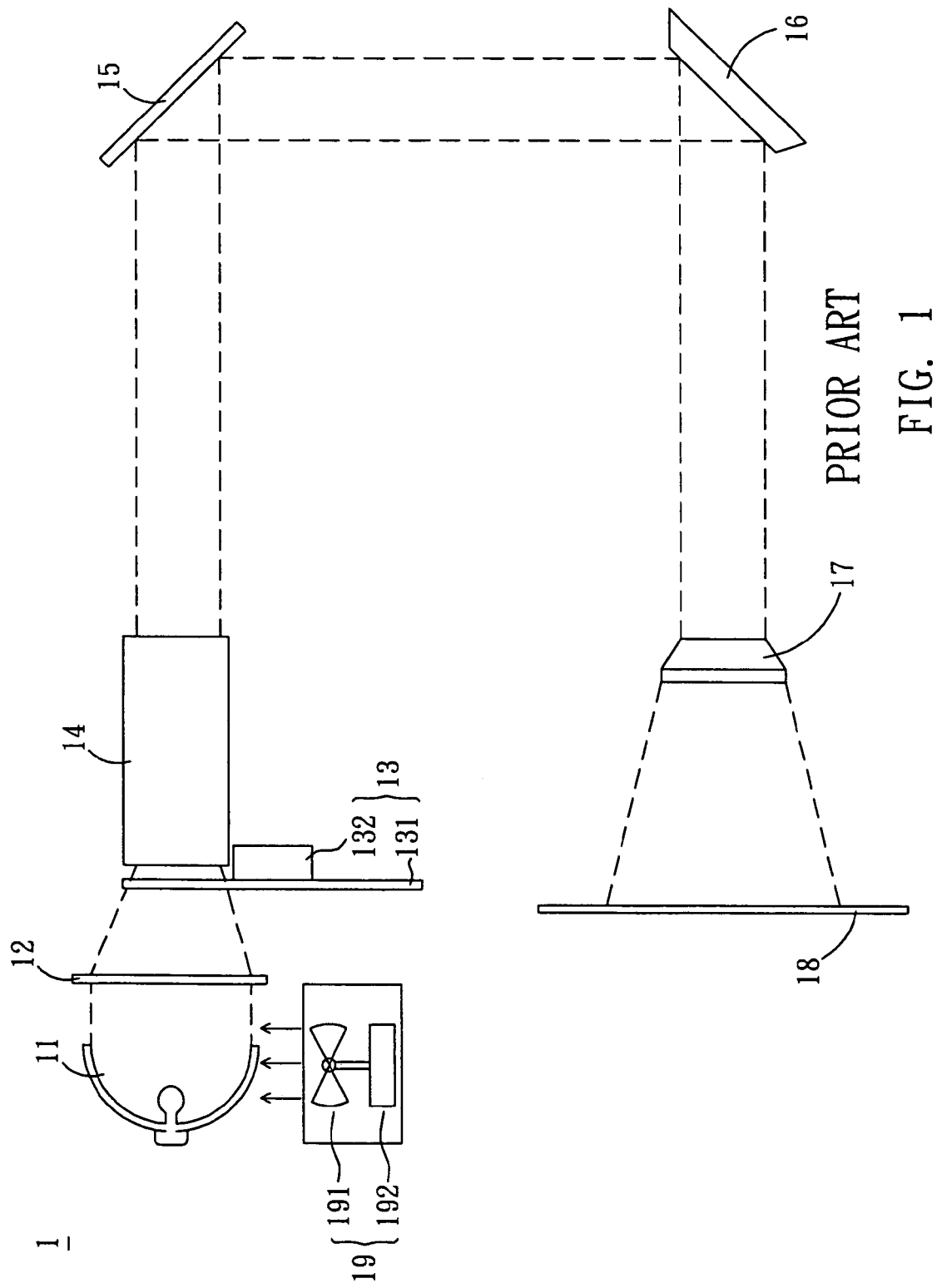
FIG. 1 is a schematic sectional view showing the conventional projection system.
Figure 2:
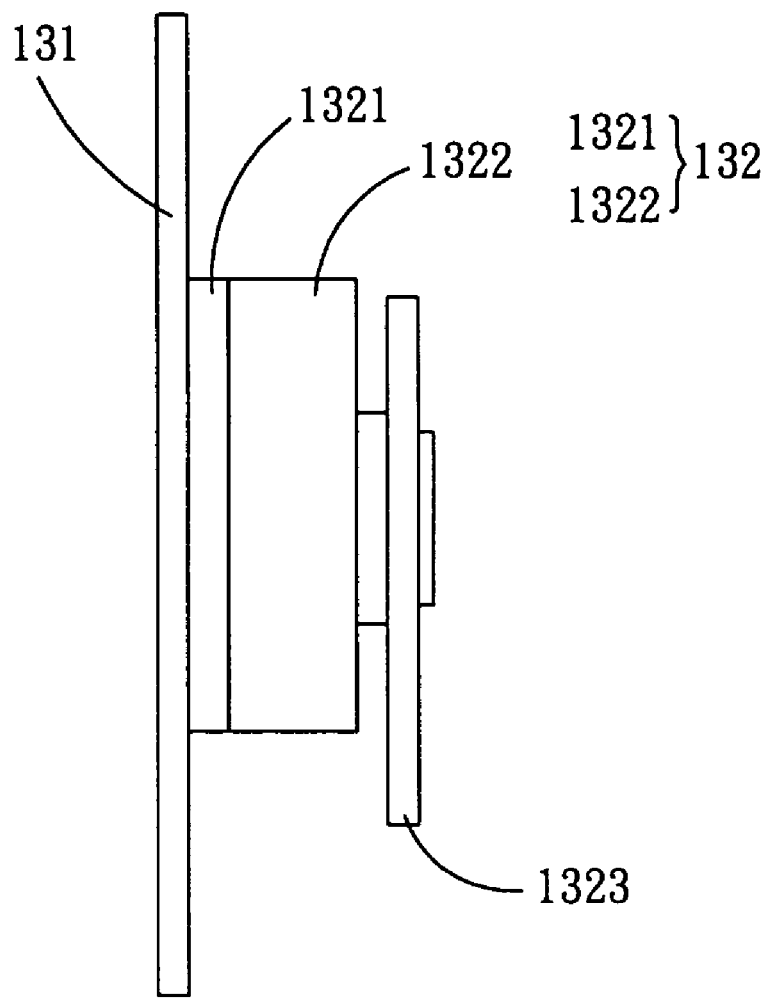
FIG. 2 is a schematic sectional view showing the conventional light-splitting device.
Figure 3:
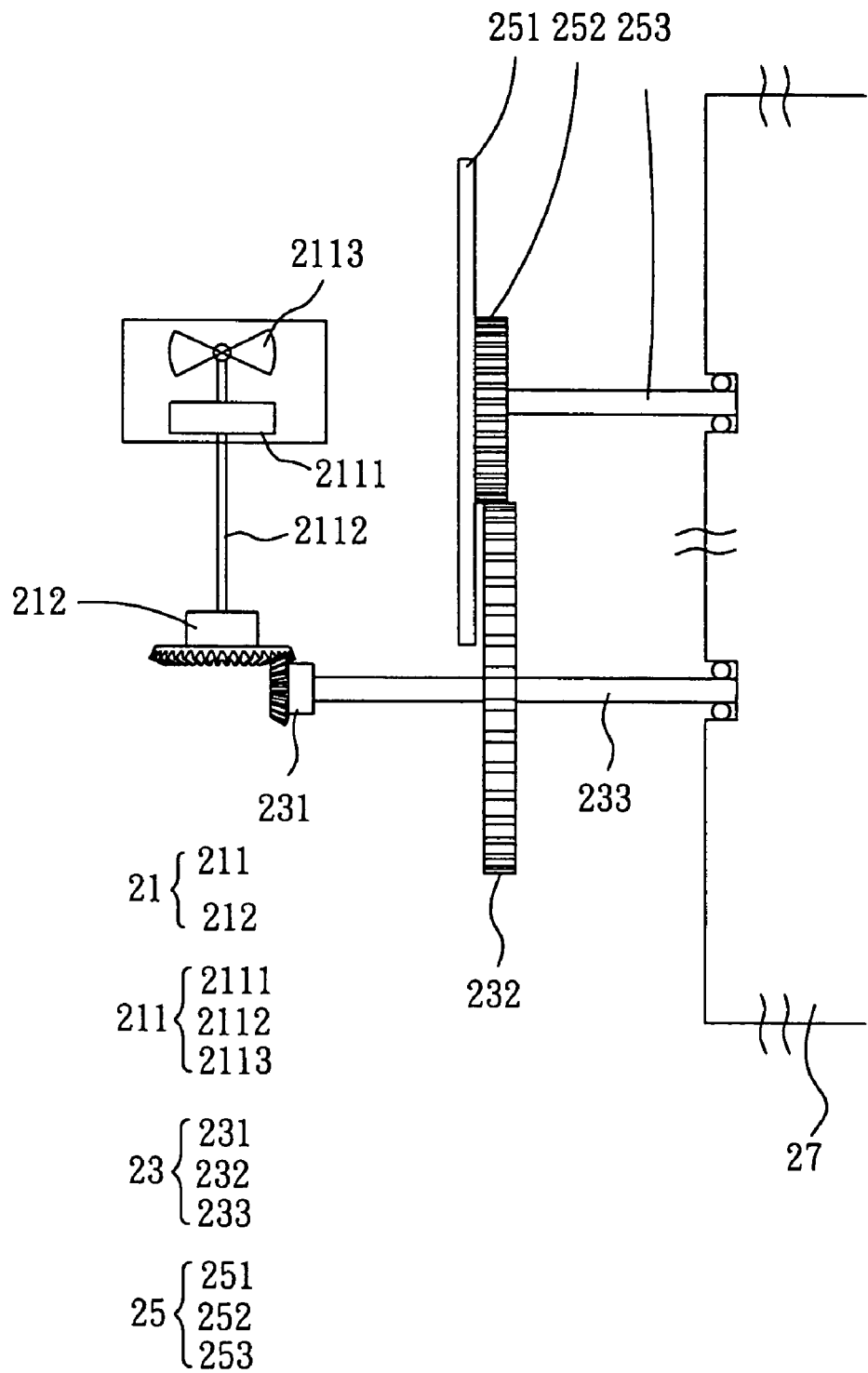
FIG. 3 is a schematic sectional view showing a light-splitting device according to a preferred embodiment of the invention.

With reference to FIG. 3, a light-splitting device 2 according to a preferred embodiment of the invention includes a power module 21, a transmission module 23, a filter module 25 and a fixing element 27.

Figure 4:
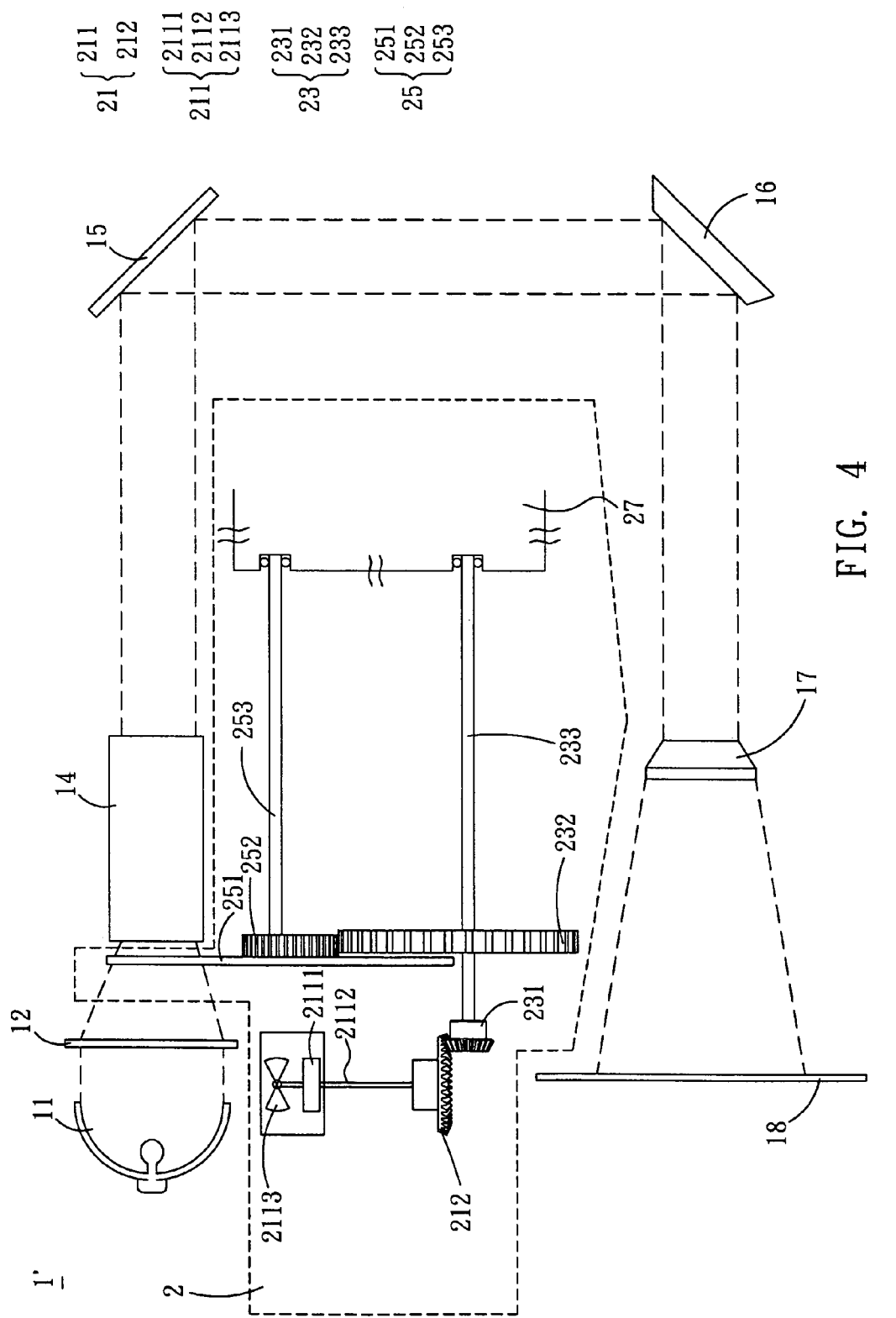
FIG. 4 is a schematic sectional view showing the light-splitting device in a projection system according to the preferred embodiment of the invention.

In the preferred embodiment, the power module 21 has a rotating component 211 and a first connection component 212. Herein, the rotating component 211 may be a fan or a blower. In this embodiment, a fan is taken as an example. The first connection component 212 may be a bevel gear, a spiral bevel gear or gears are known to persons skilled in the art. Herein, the rotating component 211 includes a motor 2111, a first rotating shaft 2112 and a plurality of blades 2113. The motor 2111 drives the rotation of the blades 2113 to produce airflow, and the ambient temperature of a light source 11 (as shown in FIG. 4) can be decreased. Further, the first rotating shaft 2112 connects the motor 2111 and the first connection component 212. When the motor 2111 of the power module 21 rotates, the power module 21 drivesthe rotation of the blades 2113 and the first connection component 212.

The transmission module 23 has a second connection component 231, a third connection component 232 and a second rotating shaft 233. Herein, the second rotating shaft 233 connects the second connection component 231 and the third connection component 232. The second connection component 231 and the third connection component 232 are rotatable around the second rotating shaft 233. The second connection component 231 connects with the first connection component 231. Further, the second rotating shaft 233 and the first rotating shaft 2112 meet at a right angle in FIG. 3. Of course, the included angle of the second rotating shaft 233 and the first rotating shaft 2112 is not limited to 90°. The included angle of the second rotating shaft 233 and the first rotating shaft 2112 can be adjusted to the design of the light-splitting device 2.

In the current embodiment, the second connection component 231 may also be a bevel gear, a spiral bevel gear or gears are known to persons skilled in the art. The second connection component 231 and the first connection component 212 could cooperate with each other. Hereinafter, the first connection component 212 and the second connection component 231 both are bevel gears taken as an example. Herein, the first connection component 212 and the second connection component 231 are in mesh. Number of teeth of the first connection component 212 maybe more than number of teeth of the second connection component 231. Of course, the ratio of the number of teeth in the first connection component 212 to the number of teeth in the second connection component 231 may be adjustable by the real needs. Also, the number of teeth in the first connection component 212 may be less than or equal to the number of teeth in the second connection component 231. Herein, in the current embodiment, the number of teeth in the first connection component 212 may be two times of the number of teeth in the second connection component 231. One turn of the first connection component 212 produces two turns of the second connection component 231. Hence, the first connection component 212 and the second connection component 231 may change the rotation speed.

In the current embodiment, the filter module 25 has a filter element 251, a fourth connection component 252 and a third rotating shaft 253. Herein, the fourth connection component 252 is disposed on one side of the filter element 251 and connects with the third connection component 232. Moreover, the fourth connection component 252 is fixed on the fixing element 27 by the third rotating shaft 253. In the current embodiment, the filter element 251 may be a circular filter or a ring-shaped filter composed of a red sector section, a green sector section, and a blue sector section. Alternatively, the filter element 251 may also be a circular filter or a ring-shaped filter composed of a red sector section, a green sector section, a blue sector section, and a transparent sector section. Of course, filter element 251 also may be a ring-shaped transparent plate or a circular transparent plate, on which at least a red film, at least a green film, and at least a blue film are formed. The third connection component 232 and the fourth connection component 252 are gears. The third connection component 232 and the fourth connection component 252 are in mesh. Additionally, number of teeth of the third connection component 232 may be more than number of teeth of the fourth connection component 252. Of course, the ratio of the number of teeth in the third connection component 232 to the number of teeth in the fourth connection component 252 may be adjustable by the real needs. Also, the number of teeth in the third connection component 232 may be less than or equal to the number of teeth in the fourth connection component 252. Herein, in the current embodiment, the number of teeth in the third connection component 232 may be two times of the number of teeth in the fourth connection component 252. One turn of the third connection component 232 produces two turns of the fourth connection component 252. Hence, the third connection component 232 and the fourth connection component 252 may change the rotation speed. Further, when the light-splitting device 2 is used in a projection system, the fixing element 27 may be a part of the projection system or other fixers.

As mentioned above, in the light-splitting device 2 of the current embodiment, the first connection component 212 connects with the second connection component 231, and the third connection component 232 connects with the fourth connection component 252. When the motor 2111 of the rotating component 211 and the first connection component 212 rotate around the first rotating shaft 2112, the first connection component 212 drives the second connection component 231 and the third connection component 232 to rotate around the second rotating shaft 233. And then, the third connection component 232 drives the rotation of the fourth connection component 252 and the filter element 251 to split the light beams. In the current embodiment, the number of teeth in the first connection component 212 may be two times of the number of teeth in the second connection component 231, and the number of teeth in the third connection component 232 may be two times of the number of teeth in the fourth connection component 252. When the motor 2111 of the power module 211 rotates at a lower speed, the filter element 251 may rotate at a high speed. Hence, the motor 2111 of the power module 21 may be a power source in the light-splitting device 2, and the power of the motor 2111 may be delivered to the filter element 251. Hence, the filter element 251 is rotatable to split the light beams. Further, the high temperature caused by the motor 2111 can be prevented, and oil of the motor 2111 would not be vaporized.

Moreover, comparing to the prior art, the filter element 251 of the light-splitting device 2 doesn't adhere to the motor 2111. Hence, when only the filter element 251 or the motor 2111 is damaged, only one of those has to be changed. Hereinafter, please referring to FIG. 4, an example is shown, wherein the light-splitting device is embodied in a projection system 1'. Herein, the same elements of FIG. 3 and FIG. 4 relate to the same assign numbers.

Figure 5:
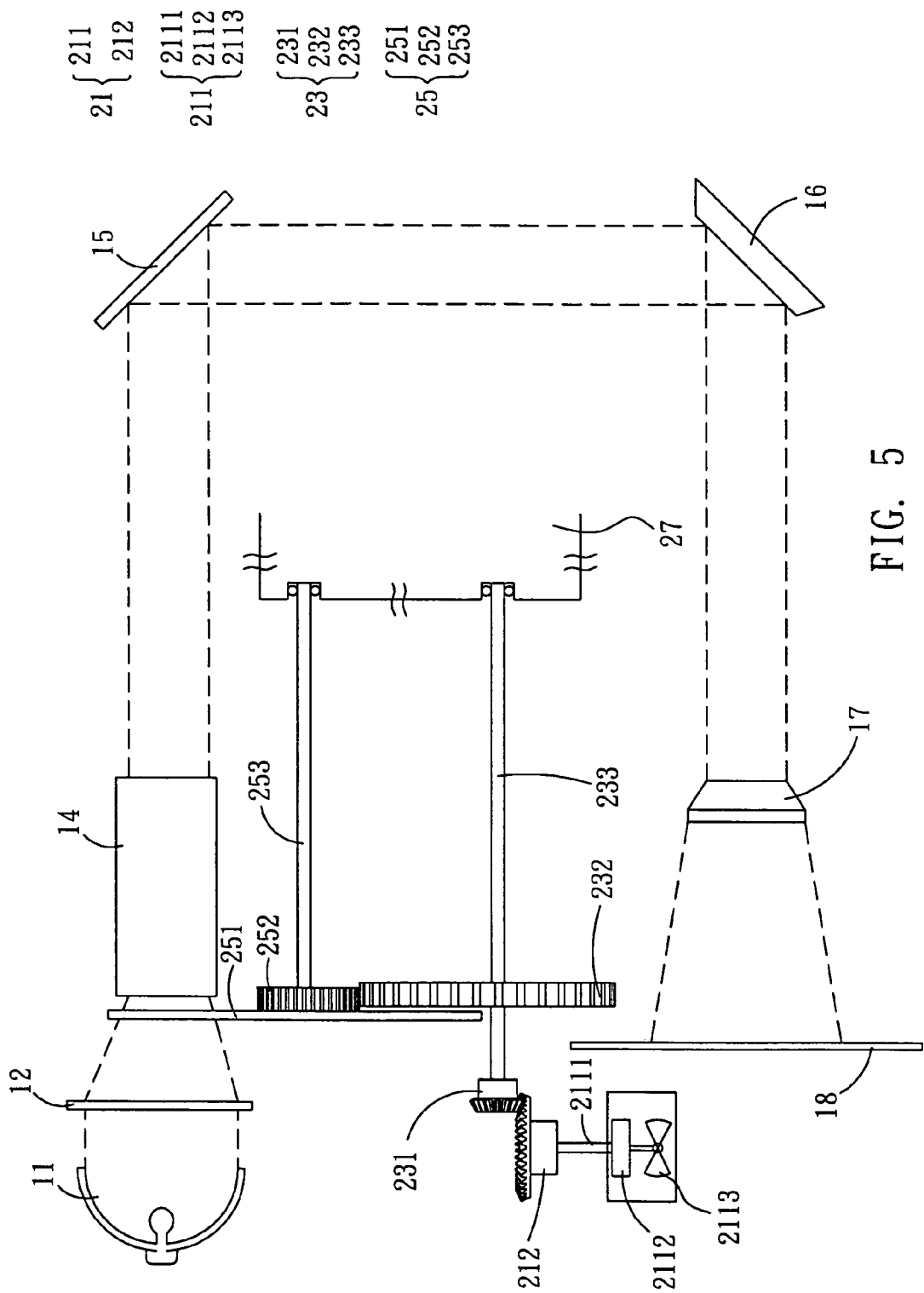
FIG. 5 is a schematic sectional view showing a light-splitting device in a projection system according to the other preferred embodiment of the invention.

Please refer to FIG. 4 again, first, the light source 11 emits light beams, and then light beams are collimated and integrated by a lens 12. Then, light beams pass through a filter element 251 of a light-splitting device 2 and a light pipe 14 sequentially. The light beams are then projected onto a digital micro-mirror device (DMD) 16 by a reflector 15. Then, the light beams may be projected by a projection lens 17 to form an image on a screen 18. In the current embodiment, the rotating component 211 of the light-splitting device 2 is near to the light source 11. The rotating component 211 drives the rotation of the filter element 251 and the blades 2113, so that heat is transferred away from, the projection system 1'. In addition, the disposition way of the light-splitting device 2 in the projection system 1' is not limited to FIG. 4. The disposition way of the light-splitting device 2 in the projection system 1' also could be same as shown in FIG. 5.

Figure 6:
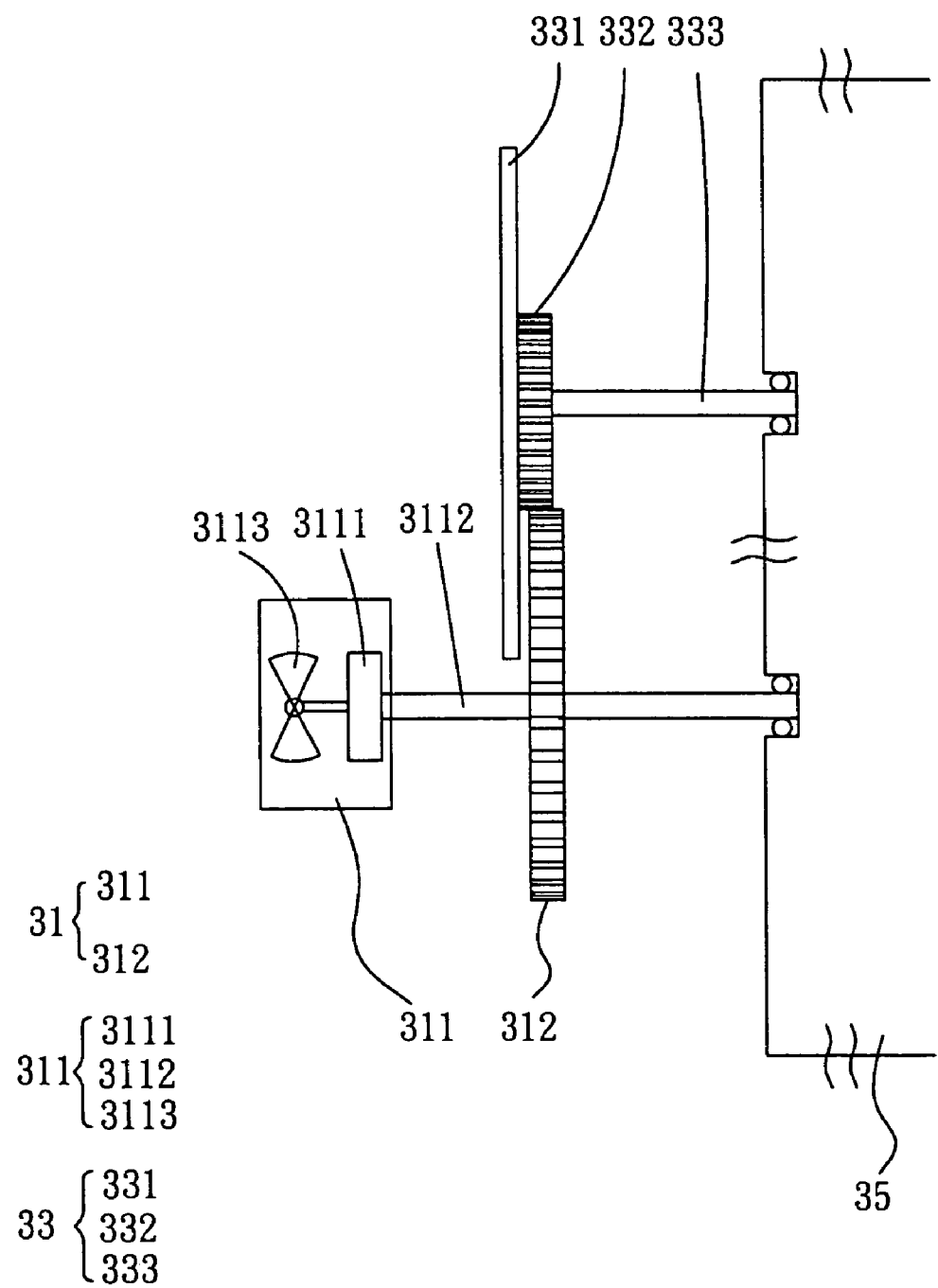
FIG. 6 is a schematic sectional view showing a light-splitting device according to another preferred embodiment of the invention.

As shown in FIG. 6, a light-splitting device 3 according to another preferred embodiment of the invention includes a power module 31 and a filter module 33, and a fixing element 35. In this case, the power module 31 has a rotating component 311 and a connection component 312. In the current embodiment, the rotating component 311 may be a fan and a blower. In this embodiment, a fan is taken as an example. The connection component 312 may be a gear. The rotating component 311 includes a motor 3111, a rotating shaft 3112 and a plurality of blades 3113. The rotating shaft 3112 connects the rotating component 311 and the connection component 312. The filter module 33 has a filter element 331, another connection component 332 and another rotating shaft 333. Another connection component 332 is disposed on one side of the filter element 331 and connects with the connection component 312. Another connection component 332 is pivoted on the fixing element 35 by another rotating shaft 333. In the current embodiment, the filter element 331 may be a circular filter or a ring-shaped filter composed of a red sector section, a green sector section, and a blue sector section. Alternatively, the filter element 331 may also be a circular filter or a ring-shaped filter composed of a red sector section, a green sector section, a blue sector section, and a transparent sector section. Of course, filter element 331 also may be a ring-shaped transparent plate or a circular transparent plate, on which at least a red film, at least a green film, and at least a blue film are formed. The connection component 312 and another connection component 332 are gears. The connection component 312 and another connection component 332 are in mesh. Additionally, number of teeth of the connection component 312 may be more than number of teeth of another connection component 332. Of course, the ratio of the number of teeth in the connection component 312 to the number of teeth in another connection component 332 may be adjustable by the real needs. Also, the number of teeth in the connection component 312 may be less than or equal to the number of teeth in another connection component 332. In the current embodiment, when the rotating component 311 and the connection component 312 rotates, the connection component 312 drives the rotation of another connection component 332 and the filter element 331. Hence, the filter element 331 may split the light beams. Simultaneously, the motor 3111 also drives the blades 3113 to rotate. Also, the rotation of the blades 3113 produces airflow, so that heat is transferred away from the projection system 3.

As mentioned above, the light-splitting device of the invention has several advantages as described the following.

1. The power module cooperates with the transmission module, so that the rotating component and the filter element may rotate simultaneously. Comparing to the prior art, the light-splitting device can reduce the use of one motor, so that the production cost can be reduced and the lifetime of the motor can be lengthened.

2. When the light-splitting device rotates, the rotating component also rotates. The rotation of the rotating component produces airflow, so that the heat is transferred away from the projection system.

3. When only the motor or the filter element is damaged, the other element can be reused. Accordingly, the production cost may also be reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light-splitting device, comprising:
a power module, which has a rotating component and a first connection component, wherein the rotating component connects with the first connection component;
a transmission module, which has a second connection component and a third connection component, wherein the second connection component connects with the first connection component; and
a filter module, which has a filter element and a fourth connection component, wherein the fourth connection component is disposed on one side of the filter element and connects with the third connection component, when the rotating component and the first connection component rotate, the first connection component drives the rotation of the second connection component and the third connection component, so that the third connection component drives the rotation of the fourth connection component and the filter element, and wherein the filter element is a filter having at least two color sections,
wherein the rotating component is a fan or a blower.

2. The light-splitting device of claim 1, wherein the rotating component comprises a motor and a first rotating shaft, the first rotating shaft connects the rotating component and the first connection component.

3. The light-splitting device of claim 1, wherein the transmission module comprises a second rotating shaft, the second rotating shaft connects the second connection component and the third connection component.

4. The light-splitting device of claim 3, further comprising:
a fixing element, on which the second rotating shaft is pivoted.

5. The light-splitting device of claim 4, wherein the filter module comprises a third rotating shaft, the fourth connection component is pivoted on the fixing element by the third rotating shaft.

6. The light-splitting device of claim 1, wherein the first connection component and the second connection component are bevel gears, number of teeth of the first connection component is more than number of teeth of the second connection component.

7. The light-splitting device of claim 1, wherein the first connection component and the second connection component are spiral bevel gears, number of teeth of the first connection component is more than number of teeth of the second connection component.

8. The light-splitting device of claim 1, wherein the third connection component and the fourth connection component are gears, number of teeth of the second connection component is more than number of teeth of the fourth connection component.

9. A light-splitting device, comprising:
 a power module, which has a rotating component and a connection component, wherein the rotating component connects with the connection component; and
 a filter module, which has a filter element and another connection component, wherein another connection component is disposed on one side of the filter element and connects with the connection component, when the rotating component and the connection component rotates, the connection component drives the rotation of another connection component and the filter element, and wherein the filter element is a filter having at least two color sections,
 wherein the rotating component is a fan or a blower.

10. The light-splitting device of claim 9, wherein the rotating component comprises a motor and a rotating shaft, the rotating shaft connects the rotating component and the connection component.

11. The light-splitting device of claim 10, further comprising:
 a fixing element, on which the rotating shaft is pivoted.

12. The light-splitting device of claim 11, wherein the filter module comprises another rotating shaft, another connection component is pivoted on the fixing element by another rotating shaft.

13. The light-splitting device of claim 9, wherein the connection component and another connection component are gears, number of teeth of the connection component is more than number of teeth of another connection component.

* * * * *